(12) United States Patent
Hoese et al.

(10) Patent No.: US 6,421,753 B1
(45) Date of Patent: *Jul. 16, 2002

(54) STORAGE ROUTER AND METHOD FOR PROVIDING VIRTUAL LOCAL STORAGE

(75) Inventors: Geoffrey B. Hoese, Austin; Jeffry T. Russell, Cibolo, both of TX (US)

(73) Assignee: Crossroads Systems, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/354,682

(22) Filed: Jul. 15, 1999

Related U.S. Application Data (63) Continuation of application No. 09/001,799, filed on Dec. 31, 1997, now Pat. No. 5,941,972.

(51) Int. Cl.⁷ .............................................. G06F 13/00
(52) U.S. Cl. .......................... 710/129; 710/128; 710/8; 710/36; 710/105
(58) Field of Search ................................. 710/129, 1–5, 710/8–13, 36–38, 100–101, 105, 126–131; 714/42; 711/112, 113, 100

(56) References Cited

U.S. PATENT DOCUMENTS

| | | | |
|---|---|---|---|
| 5,748,924 A | 5/1998 | Llorens et al. ............. 395/309 |
| 5,768,623 A | 6/1998 | Judd et al. .................. 395/857 |
| 5,809,328 A | 9/1998 | Nogales et al. ............ 395/825 |
| 5,812,754 A | 9/1998 | Lui et al. ............... 395/182.04 |
| 5,835,496 A | 11/1998 | Yeung et al. ................ 370/514 |
| 5,848,251 A | * 12/1998 | Lomelino et al. .......... 710/129 |
| 5,935,260 A | * 8/1999 | Ofer ............................. 714/42 |
| 5,941,972 A | * 8/1999 | Hose et al. ................. 710/129 |
| 5,959,994 A | * 9/1999 | Boggs et al. ................ 370/399 |
| 6,041,381 A | * 3/2000 | Hoese ......................... 710/129 |
| 6,055,603 A | * 4/2000 | Ofer et al. .................. 711/113 |
| 6,075,863 A | * 6/2000 | Krishnan et al. ............. 380/49 |
| 6,098,149 A | * 8/2000 | Ofer et al. .................. 711/112 |
| 6,118,766 A | * 9/2000 | Akers ......................... 370/249 |
| 6,148,004 A | * 11/2000 | Nelson et al. .............. 370/463 |
| 6,230,218 B1 | * 5/2001 | Casper et al. ................. 710/20 |

FOREIGN PATENT DOCUMENTS

WO           98/36357          * 8/1998

* cited by examiner

*Primary Examiner*—Christopher B. Shin
(74) *Attorney, Agent, or Firm*—Gray Cary Ware & Freidenrich, LLP (57) ABSTRACT

A storage router (56) and storage network (50) provide virtual local storage on remote SCSI storage devices (60, 62, 64) to Fiber Channel devices. A plurality of Fiber Channel devices, such as workstations, (58), are connected to a Fiber Channel transport medium (52), and a plurality of SCSI storage devices (60, 62, 64) are connected to a SCSI bus transport medium (54). The storage router (56) interfaces between the Fiber Channel transport medium (52) and the SCSI bus transport medium (54). The storage router (56) maps between the workstations (58) and the SCSI storage devices (60, 62, 64) and implements access controls for storage space on the SCSI storage devices (60, 62, 64). The storage router (56) then allows access from the workstations (58) to the SCSI storage devices (60, 62, 64) using native low level, block protocol in accordance with the mapping and the access controls.

8 Claims, 2 Drawing Sheets

STORAGE ROUTER AND METHOD FOR PROVIDING VIRTUAL LOCAL STORAGE

RELATED APPLICATIONS

This application is a continuation of, and claims priority from, U.S. patent application Ser. No. 09/001,799, filed on Dec. 31, 1997 now U.S. Pat. No. 5,941,972, now pending, the entire contects of which are hereby incorporated by reference herein.

TECHNICAL FIELD OF THE INVENTION

This invention relates in general to network storage devices, and more particularly to a storage router and method for providing virtual local storage on remote SCSI storage devices to Fibre Channel devices.

BACKGROUND OF THE INVENTION

Typical storage transport mediums provide for a relatively small number of devices to be attached over relatively short distances. One such transport medium is a Small Computer System Interface (SCSI) protocol, the structure and operation of which is generally well known as is described, for example, in the SCSI-1, SCSI-2 and SCSI-3 specifications. High speed serial interconnects provide enhanced capability to attach a large number of high speed devices to a common storage transport medium over large distances. One such serial interconnect is Fibre Channel, the structure and operation of which is described, for example, in Fibre Channel Physical and Signaling Interface (FC-PH), ANSI X3.230 Fibre Channel Arbitrated Loop (FC-AL), and ANSI X3.272 Fibre Channel Private Loop Direct Attach (FC-PLDA).

Conventional computing devices, such as computer workstations, generally access storage locally or through network interconnects. Local storage typically consists of a disk drive, tape drive, CD-ROM drive or other storage device contained within, or locally connected to the workstation. The workstation provides a file system structure, that includes security controls, with access to the local storage device through native low level, block protocols. These protocols map directly to the mechanisms used by the storage device and consist of data requests without security controls. Network interconnects typically provide access for a large number of computing devices to data storage on a remote network server. The remote network server provides file system structure, access control, and other miscellaneous capabilities that include the network interface. Access to data through the network server is through network protocols that the server must translate into low level requests to the storage device. A workstation with access to the server storage must translate its file system protocols into network protocols that are used to communicate with the server. Consequently, from the perspective of a workstation, or other computing device, seeking to access such server data, the access is much slower than access to data on a local storage device.

SUMMARY OF THE INVENTION

In accordance with the present invention, a storage router and method for providing virtual local storage on remote SCSI storage devices to Fibre Channel devices are disclosed that provide advantages over conventional network storage devices and methods.

According to one aspect of the present invention, a storage router and storage network provide virtual local storage on remote SCSI storage devices to Fibre Channel devices. A plurality of Fibre Channel devices, such as workstations, are connected to a Fibre Channel transport medium, and a plurality of SCSI storage devices are connected to a SCSI bus transport medium. The storage router interfaces between the Fibre Channel transport medium and the SCSI bus transport medium. The storage router maps between the workstations and the SCSI storage devices and implements access controls for storage space on the SCSI storage devices. The storage router then allows access from the workstations to the SCSI storage devices using native low level, block protocol in accordance with the mapping and the access controls.

According to another aspect of the present invention, virtual local storage on remote SCSI storage devices is provided to Fibre Channel devices. A Fibre Channel transport medium and a SCSI bus transport medium are interfaced with. A configuration is maintained for SCSI storage devices connected to the SCSI bus transport medium. The configuration maps between Fibre Channel devices and the SCSI storage devices and implements access controls for storage space on the SCSI storage devices. Access is then allowed from Fibre Channel initiator devices to SCSI storage devices using native low level, block protocol in accordance with the configuration.

A technical advantage of the present invention is the ability to centralize local storage for networked workstations without any cost of speed or overhead. Each workstation access its virtual local storage as if it work locally connected. Further, the centralized storage devices can be located in a significantly remote position even in excess of ten kilometers as defined by Fibre Channel standards.

Another technical advantage of the present invention is the ability to centrally control and administer storage space for connected users without limiting the speed with which the users can access local data. In addition, global access to data, backups, virus scanning and redundancy can be more easily accomplished by centrally located storage devices.

A further technical advantage of the present invention is providing support for SCSI storage devices as local storage for Fibre Channel hosts. In addition, the present invention helps to provide extended capabilities for Fibre Channel and for management of storage subsystems.

BRIEF DESCRIPTION OF THE DRAWINGS

A more complete understanding of the present invention and the advantages thereof may be acquired by referring to the following description taken in conjunction with the accompanying drawings, in which like reference numbers indicate like features, and wherein.

DETAILED DESCRIPTION OF THE INVENTION

Figure 1:
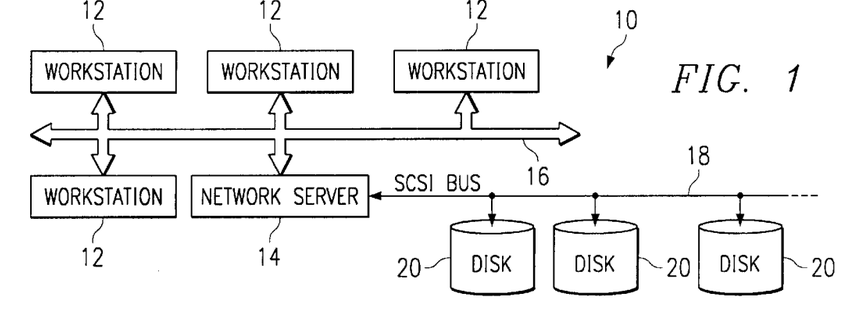
FIG. 1 is a block diagram of a conventional network that provides storage through a network server.

FIG. 1 is a block diagram of a conventional network, indicated generally at 10, that provides access to storage through a network server. As shown, network 10 includes a plurality of workstations 12 interconnected with a network server 14 via a network transport medium 16. Each workstation 12 can generally comprise a processor, memory, input/output devices, storage devices and a network adapter as well as other common computer components. Network server 14 uses a SCSI bus 18 as a storage transport medium to interconnect with a plurality of storage devices 20 (tape drives, disk drives, etc.). In the embodiment of FIG. 1, network transport medium 16 is an network connection and storage devices 20 comprise hard disk drives, although there are numerous alternate transport mediums and storage devices.

In network 10, each workstation 12 has access to its local storage device as well as network access to data on storage devices 20. The access to a local storage device is typically through native low level, block protocols. On the other hand, access by a workstation 12 to storage devices 20 requires the participation of network server 14 which implements a file system and transfers data to workstations 12 only through high level file system protocols. Only network server 14 communicates with storage devices 20 via native low level, block protocols. Consequently, the network access by workstations. 12 through network server 14 is slow with respect to their access to local storage. In network 10, it can Also be a logistical problem to centrally manage and administer local data distributed across an organization, including accomplishing tasks such as backups, virus scanning and redundancy.

Figure 2:
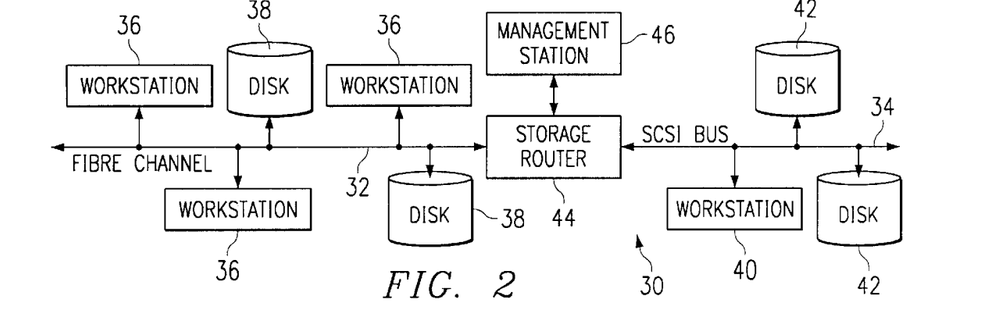
FIG. 2 is a block diagram of one embodiment of a storage network with a storage router that provides global access and outing.

FIG. 2 is a block diagram of one embodiment of a storage network, indicated generally at 30, with a storage router that provides global access and routing. This environment is significantly different from that of FIG. 1 in that there is no network server involved. In FIG. 2, a Fibre Channel high speed serial transport 32 interconnects a plurality of workstations 36 and storage devices 38. A SCSI bus storage transport medium interconnects workstations 40 and storage devices 42. A storage router 44 then serves to interconnect these mediums and provide devices on either medium global, transparent access to devices on the other medium. Storage router 44 routes requests from initiator devices on one medium to target devices on the other medium and routes data between the target and the initiator. Storage router 44 can allow initiators and targets to be on either side. In this manner, storage router 44 enhances the functionality of Fibre Channel 32 by providing access, for example, to legacy SCSI storage devices on SCSI bus 34. In the embodiment of FIG. 2, the operation of storage router 44 can be managed by a management station 46 connected to the storage router via a direct serial connection.

In storage network 30, any workstation 36 or workstation 40 can access any storage device 38 or storage device 42 through native low level, block protocols, and vice versa. This functionality is enabled by storage router 44 which routes requests and data as a generic transport between Fibre Channel 32 and SCSI bus 34. Storage router 44 uses tables to map devices from one medium to the other and distributes requests and data across Fibre Channel 32 and SCSI bus 34 without any security access controls. Although this extension of the high speed serial interconnect provided by Fibre Channel 32 is beneficial, it is desirable to provide security controls in addition to extended access to storage devices through a native low level, block protocol.

Figure 3:
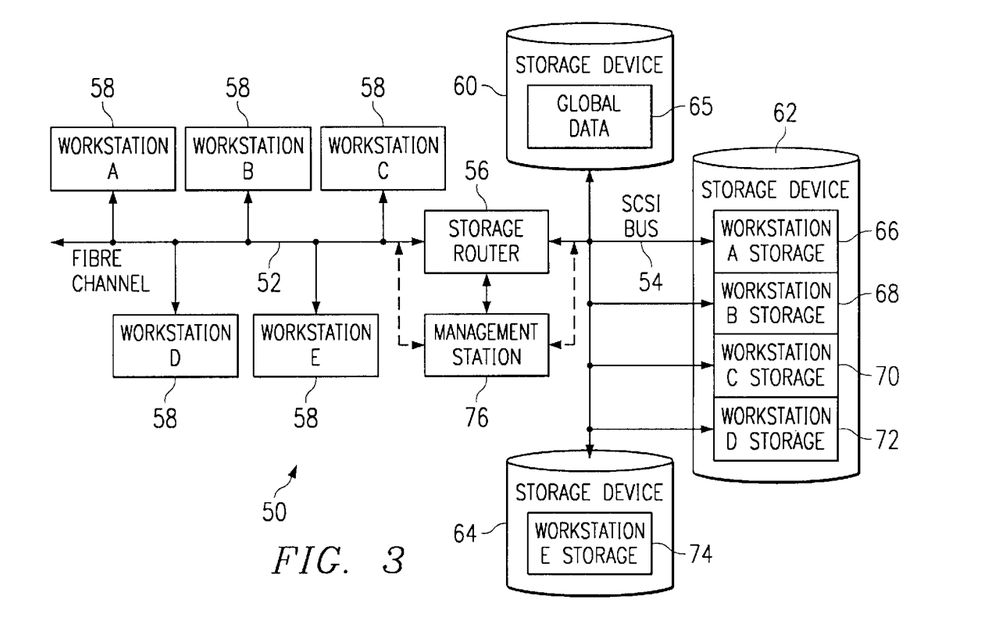
FIG. 3 is a block diagram of one embodiment of a storage network with a storage router that provides virtual local storage.

FIG. 3 is a block diagram of one embodiment of a storage network, indicated generally at 50, with a storage router that provides virtual local storage. Similar to that of FIG. 2, storage network 50 includes a Fibre Channel high speed serial interconnect 52 and a SCSI bus 54 bridged by a storage router 56. Storage router 56 of FIG. 3 provides for a large number of workstations 58 to be interconnected on a common storage transport and to access common storage devices 60, 62 and 64 through native low level, block protocols.

According to the present invention, storage router 56 has enhanced functionality to implement security controls and routing such that each workstation 58 can have access to a specific subset of the overall data stored in storage devices 60, 62 and 64. This specific subset of data has the appearance and characteristics of local storage and is referred to herein as virtual local storage. Storage router 56 allows the configuration and modification of the storage allocated to each attached workstation 58 through the use of mapping tables or other mapping techniques.

As shown in FIG. 3, for example, storage device 60 can be configured to provide global data 65 which can be accessed by all workstations 58. Storage device 62 can be configured to provide partitioned subsets 66, 68, 70 and 72, where each partition is allocated to one of the workstations 58 (workstations A, B, C and D). These subsets 66, 68, 70 and 72 can only be accessed by the associated workstation 58 and appear to the associated workstation 58 as local storage accessed using native low level, block protocols. Similarly, storage device 64 can be allocated as storage for the remaining workstation 58 (workstation E).

Storage router 56 combines access control with routing such that each workstation 58 has controlled access to only the specified partition of storage device 62 which forms virtual local storage for the workstation 58. This access control allows security control for the specified data partitions. Storage router 56 allows this allocation of storage devices 60, 62 and 64 to be managed by a management station 76. Management station 76 can connect directly to storage router 56 via a direct connection or, alternately, can interface with storage router 56 through either Fibre Channel 52 or SCSI bus 54. In the latter case, management station 76 can be a workstation or other computing device with special rights such that storage router 56 allows access to mapping tables and shows storage devices 60, 62 and 64 as they exist physically rather than as they have been allocated.

The environment of FIG. 3 extends the concept of a single workstation having locally connected storage devices to a storage network 50 in which workstations 58 are provided virtual local storage in a manner transparent to workstations 58. Storage router 56 provides centralized control of what each workstation 58 sees as its local drive, as well as what data it sees as global data accessible by other workstations 58. Consequently, the storage space considered by the workstation 58 to be its local storage is actually a partition (i.e., logical storage definition) of a physically remote storage device 60, 62 or 64 connected through storage router 56. This means that similar requests from workstations 58 for access to their local storage devices produce different accesses to the storage space on storage devices 60, 62 and 64. Further, no access from a workstation 58 is allowed to the virtual local storage of another workstation 58.

The collective storage provided by storage devices 60, 62 and 64 can have blocks allocated by programming means within storage router 56. To accomplish this function, storage router 56 can include routing tables and security controls that define storage allocation for each workstation 58. The advantages provided by implementing virtual local storage in centralized storage devices include the ability to do collective backups and other collective administrative functions more easily. This is accomplished without limiting the performance of workstations 58 because storage access involves native low level, block protocols and does not involve the overhead of high level protocols and file systems required by network servers.

Figure 4:
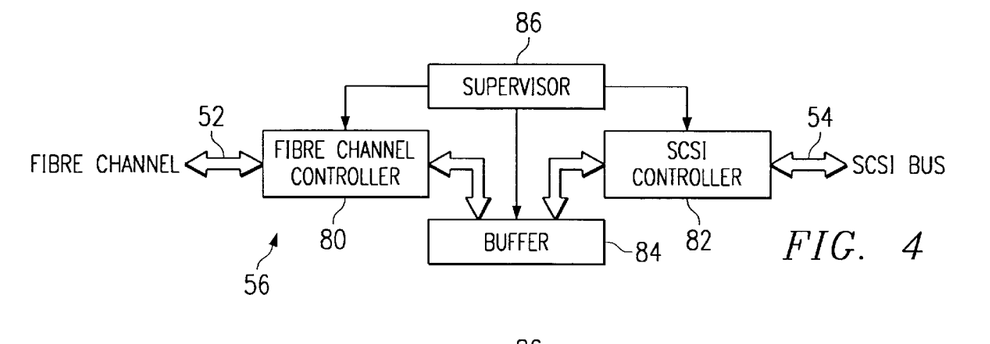
FIG. 4 is a block diagram of one embodiment of the storage router of FIG. 3.

FIG. 4 is a block diagram of one embodiment of storage router 56 of FIG. 3. Storage router 56 can comprise a Fibre Channel controller 80 that interfaces with Fibre Channel 52 and a SCSI controller 82 that interfaces with SCSI bus 54. A buffer 84 provides memory work space and is connected to both Fibre Channel controller 80 and to SCSI controller 82. A supervisor unit 86 is connected to Fibre Channel controller 80, SCSI controller 82 and buffer 84. Supervisor unit 86 comprises a microprocessor for controlling operation of storage router 56 and to handle mapping and security access for requests between Fibre Channel 52 and SCSI bus 54.

Figure 5:
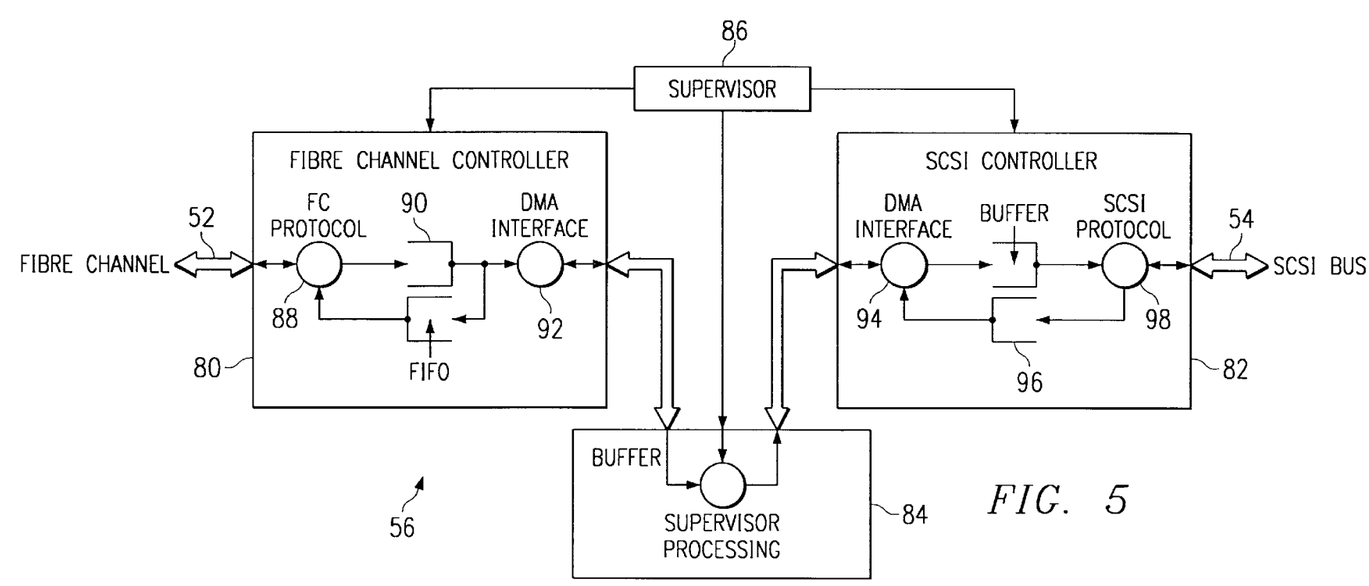
FIG. 5 is a block diagram of one embodiment of data flow within the storage router of FIG. 4.

FIG. 5 is a block diagram of one embodiment of data flow within storage router 56 of FIG. 4. As shown, data from Fibre Channel 52 is processed by a Fibre Channel (FC) protocol unit 88 and placed in a FIFO queue 90. A direct memory access (DMA) interface 92 then takes data out of FIFO queue 90 and places it in buffer 84. Supervisor unit 86 processes the data in buffer 84 as represented by supervisor processing 93. This processing involves mapping between Fibre Channel 52 and SCSI bus 54 and applying access controls and routing functions. A DMA interface 94 then pulls data from buffer 84 and places it into a buffer 96. A SCSI protocol unit 98 pulls data from buffer 96 and communicates the data on SCSI bus 54. Data flow in the reverse direction, from SCSI bus 54 to Fibre Channel 52, is accomplished in a reverse manner.

The storage router of the present invention is a bridge device that connects a Fibre Channel link directly to a SCSI bus and enables the exchange of SCSI command set information between application clients on SCSI bus devices and the Fibre Channel links. Further, the storage router applies access controls such that virtual local storage can be established in remote SCSI storage devices for workstations on the Fibre Channel link. In one embodiment, the storage router provides a connection for Fibre Channel links running the SCSI Fibre Channel Protocol (FCP) to legacy SCSI devices attached to a SCSI bus. The Fibre Channel topology is typically an Arbitrated Loop (FC_AL).

In part, the storage router enables a migration path to Fibre Channel based, serial SCSI networks by providing connectivity for legacy SCSI bus devices. The storage router can be attached to a Fibre Channel Arbitrated Loop and a SCSI bus to support a number of SCSI devices. Using configuration settings, the storage router can make the SCSI bus devices available on the Fibre Channel network as FCP logical units. Once the configuration is defined, operation of the storage router is transparent to application clients. In this manner, the storage router can form an integral part of the migration to new Fibre Channel based networks while providing a means to continue using legacy SCSI devices.

In one implementation (not shown), the storage router can be a rack mount or free standing device with an internal power supply. The storage router can have a Fibre Channel and SCSI port, and a standard, detachable power cord can be used, the FC connector can be a copper DB9 connector, and the SCSI connector can be a 68-pin type. Additional modular jacks can be provided for a serial port and a 802.3 10BaseT port, i.e. twisted pair Ethernet, for management access. The SCSI port of the storage router an support SCSI direct and sequential access target devices and can support SCSI initiators, as well. The Fibre Channel port can interface to SCSI-3 FCP enabled devices and initiators.

To accomplish its functionality, one implementation of the storage router uses: a Fibre Channel interface based on the HEWLETT-PACKARD TACHYON HPFC-5000 controller and a GLM media interface; an Intel 80960RP processor, incorporating independent data and program memory spaces, and associated logic required to implement a stand alone processing system; and a serial port for debug and system configuration. Further, this implementation includes a SCSI interface supporting Fast-20 based on the SYMBIOS 53C8xx series SCSI controllers, and an operating system based upon the WIND RIVERS SYSTEMS VXWORKS or IXWORKS kernel, as determined by design. In addition, the storage router includes software as required to control basic functions of the various elements, and to provide appropriate translations between the FC and SCSI protocols.

The storage router has various modes of operation that are possible between FC and SCSI target and initiator combinations. These modes are: FC Initiator to SCSI Target; SCSI Initiator to FC Target; SCSI Initiator to SCSI Target; and FC Initiator to FC Target. The first two modes can be supported concurrently in a single storage router device are discussed briefly below. The third mode can involve two storage router devices back to back and can serve primarily as a device to extend the physical distance beyond that possible via a direct SCSI connection. The last mode can be used to carry FC protocols encapsulated on other transmission technologies (e.g. ATM, SONET), or to act as a bridge between two FC loops (e.g. as a two port fabric).

The FC Initiator to SCSI Target mode provides for the basic configuration of a server using Fibre Channel to communicate with SCSI targets. This mode requires that a host system have an FC attached device and associated device drivers and software to generate SCSI-3 FCP requests. This system acts as an initiator using the storage router to communicate with SCSI target devices. The SCSI devices supported can include SCSI-2 compliant direct or sequential access (disk or tape) devices. The storage router serves to translate command and status information and transfer data between SCSI-3 FCP and SCSI-2, allowing the use of standard SCSI-2 devices in a Fibre Channel environment.

The SCSI Initiator to FC Target mode provides for the configuration of a server using SCSI-2 to communicate with Fibre Channel targets. This mode requires that a host system has a SCSI-2 interface and driver software to control SCSI-2 target devices. The storage router will connect to the SCSI-2 bus and respond as a target to multiple target IDs. Configuration information is required to identify the target IDs to which the bridge will respond on the SCSI-2 bus. The storage router then translates the SCSI-2 requests to SCSI-3 FCP requests, allowing the use of FC devices with a SCSI host system. This will also allow features such as a tape device acting as an initiator on the SCSI bus to provide full support for this type of SCSI device.

In general, user configuration of the storage router will be needed to support various functional modes of operation. Configuration can be modified, for example, through a serial port or through an Ethernet port via SNMP (simple network management protocol) or a Telnet session. Specifically, SNMP manageability can be provided via an 802.3 Ethernet interface. This can provide for configuration changes as well as providing statistics and error information. Configuration can also be performed via TELNET or RS-232 interfaces with menu driven command interfaces. Configuration information can be stored in a segment of flash memory and can be retained across resets and power off cycles. Password protection can also be provided.

In the first two modes of operation, addressing information is needed to map from FC addressing to SCSI addressing and vice versa. This can be 'hard' configuration data, due to the need for address information to be maintained across initialization and partial reconfigurations of the Fibre Channel address space. In an arbitrated loop configuration, user configured addresses will be needed for AL_PAs in order to insure that known addresses are provided between loop reconfigurations.

With respect to addressing, FCP and SCSI 2 systems employ different methods of addressing target devices. Additionally, the inclusion of a storage router means that a method of translating device IDs needs to be implemented. In addition, the storage router can respond to commands without passing the commands through to the opposite interface. This can be implemented to allow all generic FCP and SCSI commands to pass through the storage router to address attached devices, but allow for configuration and diagnostics to be performed directly on the storage router through the FC and SCSI interfaces.

Management commands are those intended to be processed by the storage router controller directly. This may include diagnostic, mode, and log commands as well as other vendor-specific commands. These commands can be received and processed by both the FCP and SCSI interfaces, but are not typically bridged to the opposite interface. These commands may also have side effects on the operation of the storage router, and cause other storage router operations to change or terminate.

A primary method of addressing management commands though the FCP and SCSI interfaces can be through peripheral device type addressing. For example, the storage router can respond to all operations addressed to logical unit (LUN) zero as a controller device. Commands that the storage router will support can include INQUIRY as well as vendor-specific management commands. These are to be generally consistent with SCC standard commands.

The SCSI bus is capable of establishing bus connections between targets. These targets may internally address logical units. Thus, the prioritized addressing scheme used by SCSI subsystems can be represented as follows: BUS:TARGET:LOGICAL UNIT. The BUS identification is intrinsic in the configuration, as a SCSI initiator is attached to only one bus. Target addressing is handled by bus arbitration from information provided to the arbitrating device. Target addresses are assigned to SCSI devices directly, though some means of configuration, such as a hardware jumper, switch setting, or device specific software configuration. As such, the SCSI protocol provides only logical unit addressing within the Identify message. Bus and target information is implied by the established connection.

Fibre Channel devices within a fabric are addressed by a unique port identifier. This identifier is assigned to a port during certain well-defined states of the FC protocol. Individual ports are allowed to arbitrate for a known, user defined address. If such an address is not provided, or if arbitration for a particular user address fails, the port is assigned a unique address by the FC protocol. This address is generally not guaranteed to be unique between instances. Various scenarios exist where the AL-PA of a device will change, either after power cycle or loop reconfiguration.

The FC protocol also provides a logical unit address field within command structures to provide addressing to devices internal to a port. The FCP_CMD payload specifies an eight byte LUN field. Subsequent identification of the exchange between devices is provided by the FQXID (Fully Qualified Exchange ID).

FC ports can be required to have specific addresses assigned. Although basic functionality is not dependent on this, changes in the loop configuration could result in disk targets changing identifiers with the potential risk of data corruption or loss. This configuration can be straightforward, and can consist of providing the device a loop-unique ID (AL_PA) in the range of "01h" to "EFh." Storage routers could be shipped with a default value with the assumption that most configurations will be using single storage routers and no other devices requesting the present ID. This would provide a minimum amount of initial configuration to the system administrator. Alternately, storage routers could be defaulted to assume any address so that configurations requiring multiple storage routers on a loop would not require that the administrator assign a unique ID to the additional storage routers.

Address translation is needed where commands are issued in the cases FC Initiator to SCSI Target and SCSI Initiator to FC Target. Target responses are qualified by the FQXID and will retain the translation acquired at the beginning of the exchange. This prevents configuration changes occurring during the course of execution of a command from causing data or state information to be inadvertently misdirected. Configuration can be required in cases of SCSI Initiator to FC Target, as discovery may not effectively allow for FCP targets to consistently be found. This is due to an FC arbitrated loop supporting addressing of a larger number of devices than a SCSI bus and the possibility of FC devices changing their AL-PA due to device insertion or other loop initialization.

In the direct method, the translation to BUS:TARGET:LUN of the SCSI address information will be direct. That is, the values represented in the FCP LUN field will directly map to the values in effect on the SCSI bus. This provides a clean translation and does not require SCSI bus discovery. It also allows devices to be dynamically added to the SCSI bus without modifying the address map. It may not allow for complete discovery by FCP initiator devices, as gaps between device addresses may halt the discovery process. Legacy SCSI device drivers typically halt discovery on a target device at the first unoccupied LUN, and proceed to the next target. This would lead to some devices not being discovered. However, this allows for hot plugged devices and other changes to the loop addressing.

In the ordered method, ordered translation requires that the storage router perform discovery on reset, and collapses the addresses on the SCSI-bus to sequential FCP LUN values. Thus, the FCP LUN values 0-N can represent N+1 SCSI devices, regardless of SCSI address values, in the order in which they are isolated during the SCSI discovery process. This would allow the FCP initiator discovery process to identify all mapped SCSI devices without further configuration. This has the limitation that hot-plugged devices will not be identified until the next reset cycle. In this case, the address may also be altered as well.

In addition to addressing, according to the present invention, the storage router provides configuration and access controls that cause certain requests from FC Initiators to be directed to assigned virtual local storage partitioned on SCSI storage devices. For example, the same request for LUN 0 (local storage) by two different FC Initiators can be directed to two separate subsets of storage. The storage router can use tables to map, for each initiator, what storage access is available and what partition is being addressed by a particular request. In this manner, the storage space provided by SCSI storage devices can be allocated to FC initiators to provide virtual local storage as well as to create any other desired configuration for secured access.

Although the present invention has been described in detail, it should be understood that various changes, substitutions, and alterations can be made hereto without departing from the spirit and scope of the invention as defined by the appended claims.

What is claimed is:

1. A data storage gateway capable of interfacing with and providing connectivity and mapping between a Fiber Channel and SCSI channel interface, the data storage gateway comprising:

a virtual storage;

a storage router in communication with and providing mapping to the virtual storage such that a fiber channel device remote from the virtual storage can communicate data to and from the virtual storage; and wherein the storage router is capable of configuring a SCSI device to contain at least a portion of the virtual storage.

2. The data storage gateway according to claim 1, further including a memory work space for the storage router using a buffer.

3. The data storage gateway according to claim 2 wherein a Fibre Channel transport medium connects to the storage router and interfaces with a Fibre Channel controller and wherein a SCSI bus transport medium connects to the storage router and interfaces with a SCSI controller.

4. A method for providing, through a storage router, virtual local storage on remote SCSI storage devices to Fibre Channel devices, comprising:

interfacing with a Fibre Channel transport medium;

interfacing with a SCSI bus transport medium;

maintaining a configuration for SCSI storage devices connected to the SCSI bus transport medium that maps between Fibre Channel devices and the SCSI storage devices and that implements access controls for storage space on the SCSI storage devices; and allowing access from Fibre Channel initiator devices to SCSI storage devices using native low level, block protocol in accordance with the configuration.

5. The method of claim 4, further comprising the step of providing memory work space for the storage router using a buffer.

6. The method of claim 5, wherein the Fibre Channel transport medium connects to and interfaces with a Fibre Channel controller and wherein said SCSI bus transport medium connects to and interfaces with a SCSI controller.

7. The method of claim 5, wherein the maintaining step and the allowing step are performed by a supervisor unit.

8. The method of claim 7, wherein the supervisor unit is coupled to the Fibre Channel controller, the SCSI controller, and the buffer.

* * * * *

US006421753C1

(12) EX PARTE REEXAMINATION CERTIFICATE (5468th)
United States Patent
Hoese et al.

(10) Number: US 6,421,753 C1
(45) Certificate Issued: Aug. 1, 2006

(54) STORAGE ROUTER AND METHOD FOR PROVIDING VIRTUAL LOCAL STORAGE

(75) Inventors: Geoffrey B. Hoese, Austin, TX (US); Jeffry T. Russell, Cibolo, TX (US)

(73) Assignee: Crossworlds Software, Burlingame, CA (US)

Reexamination Request:
No. 90/007,124, Jul. 19, 2004

Reexamination Certificate for:
Patent No.: 6,421,753
Issued: Jul. 16, 2002
Appl. No.: 09/354,682
Filed: Jul. 15, 1999

Related U.S. Application Data (63) Continuation of application No. 09/001,799, filed on Dec. 31, 1997, now Pat. No. 5,941,972.

(51) Int. Cl.
*G06F 13/00* (2006.01)

(52) U.S. Cl. .............................. 710/315; 710/2; 710/8; 710/36; 710/105; 710/305; 710/308; 711/112

(58) Field of Classification Search ................ 710/129, 710/1–5, 8–13, 36–38, 100–101, 105, 305–316; 714/42; 711/100, 112, 113
See application file for complete search history.

(56) References Cited

U.S. PATENT DOCUMENTS

| | | |
|---|---|---|
| 3,082,406 A | 3/1963 | Stevens |
| 4,092,732 A | 5/1978 | Ouchi |
| 4,695,948 A | 9/1987 | Blevins et al. |
| 4,751,635 A | 6/1988 | Kret |
| 4,864,532 A | 9/1989 | Reeve et al. |
| 4,947,367 A | 8/1990 | Chang et al. |
| 5,072,378 A | 12/1991 | Manka |
| 5,163,131 A | 11/1992 | Row et al. |
| 5,239,632 A | 8/1993 | Larner |
| 5,239,643 A | 8/1993 | Blount et al. |
| 5,257,386 A | 10/1993 | Saito |
| 5,345,565 A * | 9/1994 | Jibbe et al. .................. 710/316 |
| 5,347,384 A | 9/1994 | McReynolds et al. |
| 5,394,526 A * | 2/1995 | Crouse et al. .............. 709/219 |
| 5,414,820 A | 5/1995 | McFarland et al. |

(Continued)

FOREIGN PATENT DOCUMENTS

| | | |
|---|---|---|
| EP | 0810530 A2 | 12/1997 |
| EP | 0827059 A2 | 3/1998 |
| GB | 2296798 A | 7/1996 |
| GB | 2297636 A | 8/1996 |
| GB | 2341715 | 3/2000 |
| JP | 6301607 | 10/1994 |
| JP | 8-230895 | 9/1996 |
| WO | WO 99/34297 A1 | 7/1999 |

OTHER PUBLICATIONS

Petal: Distributed Virtual Disks, Edward K. Lee and Chandramohan A. Thekkath, ACM SIGPLAN Notices, vol. 31, Issue 9, Sep. 1996, pp. 84–92.*

(Continued)

*Primary Examiner*—Dov Popovici (57) ABSTRACT

A storage router (56) and storage network (50) provide virtual local storage on remote SCSI storage devices (60, 62, 64) to Fiber Channel devices. A plurality of Fiber Channel devices, such as workstations, (58), are connected to a Fiber Channel transport medium (52), and a plurality of SCSI storage devices (60, 62, 64) are connected to a SCSI bus transport medium (54). The storage router (56) interfaces between the Fiber Channel transport medium (52) and the SCSI bus transport medium (54). The storage router (56) maps between the workstations (58) and the SCSI storage devices (60, 62, 64) and implements access controls for storage space on the SCSI storage devices (60, 62, 64). The storage router (56) then allows access from the workstations (58) to the SCSI storage devices (60, 62, 64) using native low level, block protocol in accordance with the mapping and the access controls.

U.S. PATENT DOCUMENTS

| | | | |
|---|---|---|---|
| 5,423,044 | A | 6/1995 | Sutton et al. |
| 5,465,382 | A | 11/1995 | Day, III et al. |
| 5,530,845 | A | 6/1996 | Hiatt et al. |
| 5,535,352 | A | 7/1996 | Bridges et al. |
| 5,581,714 | A | 12/1996 | Amini et al. |
| 5,596,562 | A | 1/1997 | Chen |
| 5,596,736 | A | 1/1997 | Kerns |
| 5,598,541 | A | 1/1997 | Malladi |
| 5,634,111 | A * | 5/1997 | Oeda et al. .................. 711/153 |
| 5,680,556 | A | 10/1997 | Begun et al. |
| 5,701,491 | A | 12/1997 | Dunn et al. |
| 5,712,976 | A | 1/1998 | Falcon et al. |
| 5,729,705 | A | 3/1998 | Weber |
| 5,743,847 | A | 4/1998 | Nakamura et al. |
| 5,751,975 | A | 5/1998 | Gillespie et al. |
| 5,774,683 | A | 6/1998 | Gulick |
| 5,845,107 | A | 12/1998 | Fisch et al. |
| 5,857,080 | A | 1/1999 | Jander et al. |
| 5,864,653 | A | 1/1999 | Tavallaei et al. |
| 5,867,648 | A | 2/1999 | Foth et al. |
| 5,884,027 | A | 3/1999 | Garbus et al. |
| 5,913,045 | A | 6/1999 | Gillespie et al. |
| 5,923,557 | A | 7/1999 | Eidson |
| 5,941,969 | A | 8/1999 | Ram et al. |
| 5,953,511 | A | 9/1999 | Sescilia et al. |
| 5,974,530 | A | 10/1999 | Young |
| 5,978,379 | A | 11/1999 | Chan et al. |
| 5,991,797 | A | 11/1999 | Futral et al. |
| 6,000,020 | A | 12/1999 | Chin et al. |
| 6,021,451 | A | 2/2000 | Bell et al. |
| 6,065,087 | A | 5/2000 | Keaveny et al. |
| 6,070,253 | A | 5/2000 | Tavallaei et al. |
| 6,131,119 | A | 10/2000 | Fukui |
| 6,134,617 | A | 10/2000 | Weber |
| 6,141,737 | A | 10/2000 | Krantz et al. |
| 6,145,006 | A | 11/2000 | Vishlitsky et al. |
| 6,209,023 | B1 | 3/2001 | Dimitroff et al. |
| 6,223,266 | B1 | 4/2001 | Sartore |
| 6,260,120 | B1 | 7/2001 | Blumenau et al. |
| 6,330,629 | B1 | 12/2001 | Kondo et al. |
| 6,341,315 | B1 | 1/2002 | Arroyo et al. |
| 6,343,324 | B1 | 1/2002 | Hubis et al. |
| 6,363,462 | B1 | 3/2002 | Bergsten |
| 6,421,753 | B1 | 7/2002 | Hoese et al. |
| 6,425,035 | B1 | 7/2002 | Hoese et al. |
| 6,425,036 | B1 | 7/2002 | Hoese et al. |
| 6,484,245 | B1 | 11/2002 | Sanada et al. |
| 6,529,996 | B1 | 3/2003 | Nguyen et al. |

OTHER PUBLICATIONS

Systems Architecture Using Fibre Channel, Roger Cummings, Twelfth IEE Symposium on Mass Storage Systems, copyright 1993, IEEE. pp. 251–256.*

Fibre Channel and ATM: The Physical Layers, Jerry Quam, WESCON/94, published Sep. 27–29, 1994. pp. 648–652.*

CRD–5500 SCSI Raid Contr4oller User's Manual CMD Technology, Inc. pp. 1–1 to 6–25, revised Nov. 21, 1996.

Black Box, SCSI Fiberoptic Extender, Single–Ended, Product Insert, 2 pages, 1996.

CRD–5500, Raid Disk Array Controller Product Insert, pp. 1–5.

CRD–5500, SCSI Raid Controller OEM Manual, Rev. 1.3, Feb. 26, 1996, pp. 1–54.

Raidtec FibreArray and Raidtec FlexArray UltraRAID Systems, Windows IT Pro Article, Oct. 1997.

DIGITAL Storage Works, HSZ70 Array Controller, HSOF Version 7.0 EK–HSZ70–CG. A01, Digital Equipment Corporation, Maynard, Massachusetts.

DIGITAL StorageWorks HSZ270 Array Controller HSOF Version 7.0 EK–HSZ270–RM, A01. CLI Reference Manual.

DIGITAL StorageWorks, Using Your HSZ70 Array Controller in a SCSI Controller Shelf (DS–BA356–M Series), User's Guide, pp. 1–1 through A–5 with index, Jan. 1998.

DIGITAL Storageworks HSG80 Array Controller ACS Version 8.0 (User's Guide) Jan. 1998.

DIGITAL StorageWorks HSZ70 Array Controller HSOF Version 7.0 EK–HSZ70–SV. A01.

Emerson, "Ancor Communications: Performance evaluation of switched fibre channel I/O system using—FCP for SCSI" Feb. 1, 1995, IEEE, pp. 479–484.

IBM Technical Publication: Magstar and IBM 3590 High Performance Tape Subsystem Technical Guide, Nov. 1996, pp. 1–269.

Guide to Sharing and Partitioning IBM Tape Library Dataservers, Nov. 1996, IBM, International Technical Support Organization, San Jose Center.

Misc. Reference Manual Pages, SunOS 5.09.

Block–Based Distributed File Systems, Anthony J. McGregor, Jul. 1997.

Infoserver 100 System Operations Guide, First Edition Digital Equipment Corporation, 1990.

S.P. Joshi, "Ethernet controller chip interfaces with variety of 16–bit processors," electronic Design, Hayden Publishing Co., Inc., Rochelle Park, NJ, Oct. 14, 1982, pp 193–200.

DP5380 Asynchronous SCSI Interface, National Semiconductor Corporation, Arlington, TX, May 1989, pp. 1–32.

Johnson, D.B., et al., The Peregrine High Performance RPC System, Software–Practice and Experience, 23(2):201–21, Feb. 1993.

InfoSrver 150—Installation and Owner's Guide, EK–INFSV–0M–001, Digital Equipment Corporatino, Maynard, Massachusetts 1991, Chapters 1 and 2.

InfoServer 150VXT Photograph.

Pictures of internal components of the InfoServer 150, taken from http://bindarydinosaurs.couk/Museum/Digital/infoserver/infoserver.php in Nov. 2004.

Simplest Migration to Fibre Channel Technology, Article, Digital Equpment Corporation, Nov. 10, 1997, published on PR Newswire.

Compaq Storageworks HSG80 Array Controller ACS Version 8.3 (Maintenance and Service Guide) Nov. 1998.

Compaq Storageworks HSG80 Array Controller ACS Version 8.3 (Configuration and CLI Refeence Guide) Nov. 1998.

Office Action dated Jan. 21, 2003 for 10/174,720.

Office Action dated Feb. 27, 2001 for 09/354,682.

Office Action dated Aug. 11, 2000 for 09/354,682.

Office Action dated Dec. 16, 1999 for 09/354,682.

Office Action dated Nov. 6, 2002 for 10/023,786.

Office Action dated Jan. 21, 2003 for 10/081,110.

Office Action dated Jan. 27, 2005 in 10/658,163, Feb. 27, 2005.

Office Action in Ex Parte Reexamination 90/007,127, mailed 0207/05, Feb. 7, 2005.

Office Action in Ex Parte Reexamination 90/007,126, mailed 0207/05, Feb. 7, 2005.

Office Action in Ex Parte Reexamination 90/007,125, mailed Feb. 7, 2005.

Office Action in Ex Parte Reexamination 90/007,124, mailed Feb. 7, 2005.

Office Action in Ex Parte Reexamination 90/007,123, mailed 0207/05, Feb. 7, 2005.

European Office Action issued Apr. 1, 2004 in Application No. 98966104.6–2413.

Defendant's First Supplemental Trial Exhibit List, *Crossroads Systems, Inc., v. Chaparral Network Storage, Inc.,* C.A. No. A–00CA–217–SS (W.D. Tex. 2001). (CD–Rom).

Defendant's Third Supplemental Trial Exhibit List, *Crossroads Systems, Inc. v. Pathlight Technology, Inc.,* C.A. No. A–00CA–248–SS (W.D. Tex. 2001). (CD–Rom).

Defendant's Trial Exhibits, *Crossroads Systems, Inc. v. Pathlight Technology, Inc.,* C.A. No. A–00CA–248–SS (W.D. Tex. 2001). (CD–Rom).

Defendants' Trial Exhibits, *Crossroads Systems, Inc., v. Chaparral Network Storage, Inc.,* C.A. No. A–00CA–217–SS (W.D. Tex. 2001). (CD–Rom).

Defendant Chapparal Network Storage, Inc.'s First Supplemental Trial Exhibit List (D1 through D271) (CD–ROM Chaparral Exhibits ExList_Def), Sep. 2, 2001.

Defendant Pathlight Technology Inc.'s Third Supplemental Trial Exhibit List (CD–ROM Pathlight Exhibits ExList_Def).

Plaintiff's Fourth Amended Trial Exhibit List, *Crossroads Systems, Inc. v. Chaparral Network Storage, Inc,* C.A. No. A–00CA–217–SS (W.D. Tex. 2001) (CD–Rom), Sep. 11, 2001.

Plaintiff's Revised Trial Exhibit List, *Crossroads Systems, Inc. v. Pathlight Technology, Inc.,* C.A. No. A–00CA–248–SS (W.D. Tex. 2001). (CD–Rom).

Plaintiff's Trial Exhibits, *Crossroads Systems, Inc. v. Chaparral Networks Storage, Inc.,* C.A. No. A–00CA–217–SS (W.D. Tex. 2001) (CD–Rom).

Plaintiff's Fourth Amended Trial Exhibit List (CD–ROM Chaparral Exhibits ExList_Plaintiff), Sep. 11, 2001.

Plaintiff's Revised Trial Exhibit List (CD–ROM Pathlight Exhibits ExList_Plaintiff).

Trial Transcripts, *Crossroads Systems, Inc. v. Chaparral Network Storage, Inc.,* C.A. No. A–00CA–217–SS (W.D. Tex. 2001) (CD–Rom).

Trial Transcripts, *Crossroads Systems, Inc. v. Pathlight Technology, Inc.,* C.A. No. A–00CA–248–SS (W.D. Tex. 2001). (CD–Rom).

Trial Exhibits and Transcripts, *Crossroads v. Chaparral,* Civil Action No. A–00CA–21755, W.D. Tex. 2000 (CD–Rom and hard copy printouts).

Snively, "Sun Microsystem Computer Corporation: Implementing a fibre optic channel SCSI transport" 1994 IEEE, Feb. 28, 1994, pp. 78–82.

Datasheet for CrossPoint 4100 Fibre Channel to SCSI Router (Dedek Ex 41 (ANCT 117–120)) (CD–ROM Chaparral Exhibits D012).

Symbios Logic—Software Interface Specification Series 3 SCSI RAID Controller Software Release 02.xx (Engelbrecht Ex 2 (LSI 1421–1658)) (CD–ROM Chaparral Exhibits D013), Dec. 3, 1997.

Press Release—Symbios Logic to Demonstrate Strong Support for Fibre Channel at Fall Comdex (Engelbrecht 12 (LSI 2785–86)) (CD–ROM Chaparral Exhibits D016), Nov. 13, 1996.

OEM Datasheet on the 3701 Controller (Engelbrecht 13 (LSI 01837–38)) (CD–ROM Chaparral Exhibits D017), Jun. 17, 1905.

Nondisclosure Agreement Between Adaptec and Crossroads Dated Oct. 17, 1996 (Quisenberry Ex 25 (CRDS 8196)) (CD–ROM Chaparral Exhibits D020).

Organizational Presentation on the External Storage Group (Lavan Ex 1 (CNS 182242–255)) (CD–ROM Chaparral Exhibits D021), Apr. 11, 1996.

Bridge. C, Bridge Between SCSI–2 and SCSI–3 FCP (Fibre Channel Protocol) (CD–ROM Chaparral Exhibits P214).

Bridge Phase II Architecture Presentation (Lavan Ex 2 (CNS 182287–295)) (CD–ROM Chaparral Exhibits D022), Apr. 12, 1996.

Attendees/Action Items from Apr. 12, 1996 Meeting at BTC (Lavan Ex 3 (CNS 182241)) (CD–ROM Chaparral Exhibits D023).

Brooklyn Hardware Engineering Requirements Documents, Revision 1.4 (Lavan Ex 4 (CNS 178188–211)) (CD–ROM Chaparral Exhibits D024) by Pecone, May 26, 1996.

Brooklyn Single–Ended SCSI Raid BRIDGE Controller Hardware OEM Manual, Revision 2.1 (Lavan EX 5 (CNS 177169–191)) (CD–ROM Chaparral Exhibits D025), Mar. 21, 1996.

Coronado Hardware Engineering Requirements Document, Revision 0.0 (Lavan Ex 7 (CNS 176917–932)) (CD–ROM Chaparral Exhibits D027) by O'Dell, Sep. 30, 1996.

ESS/FPG Organization (Lavan Ex 8 (CNS 178639–652)) (CD–ROM Chaparral Exhibits D028), Dec. 6, 1996.

Adaptec MCS ESS Presents: Intelligent External I/O Raid Controllers "Bridge" Strategy (Lavan Ex 9 (CNS 178606–638)). (CD–ROM Chaparral Exhibits D029), Feb. 6, 1996.

AEC–7313 Fibre Channel Daughter Board (for Brooklyn) Engineering Specification, Revision 1.0 (Lavan Ex 10 (CNS 176830–850)) (CD–ROM Chaparral Exhibits D030), Feb. 27, 1997.

Bill of Material (Lavan Ex 14 (CNS 177211–214)) (CD–ROM Chaparral Exhibits D034), Jul. 24, 1997.

AEC–. 4412B, AEC–7412/B2 External RAID Controller Hardware 0EM Manual, Revision 2.0 (Lavan Ex 15 (CNS 177082–123)) (CD–ROM Chaparral Exhibits D035), Jun. 27, 1997.

Coronado II, AEC–7312A Fibre Channel Daughter (for Brooklyn) Hardware Specification, Revision 1.2 (Lavan Ex 16 (CNS 177192–210)) (CD–ROM Chaparral Exhibits D037) by Tom Yang, Jul. 18, 1997.

AEC–4412B, AEC7412/3B External RAID Controller Hardware OEM Manual, Revision 3.0. (Lavan Ex 17 (CNS 177124–165)) (CD–ROM Chaparral Exhibits D036), Aug. 25, 1997.

Memo Dated Aug. 15, 1997 to AEC–7312A Evaluation Unit Customers re: B001 Release Notes (Lavan Ex 18 (CNS 182878–879)) (CD–ROM Chaparral Exhibits D038).

Brooklyn Main Board (AES–0302) MES Schedule (Lavan Ex 19 (CNS 177759–763)) (CD–ROM Chaparral Exhibits D039), Feb. 11, 1997.

News Release–Adaptec Adds Fibre Channel Option to its External RAID Controller Family (Lavan Ex 20 (CNS 182932–934)) (CD–ROM Chaparral Exhibits D040), May. 6, 1997.

AEC–4412B/7412B User's Guide, Rev. A (Lavan Ex 21) (CD–ROM Chaparral Exhibits D041), Jun. 19, 1905.

Data Book—AIC–7895 PCI Bus Master Single Chip SCSI Host Adapter (Davies Ex 1 (CNS 182944–64)) (CD–ROM Chaparral Exhibits D046), May 21, 1996.

Data Book—AIC–1160 Fibre Channel Host Adapter ASIC (Davies Ex 2 (CNS 181800–825)) (CD–ROM Chaparral Exhibits D047), Jun. 18, 1905.

Viking RAID Software (Davies Ex 3 (CNS 180969–181026)) (CD–ROM Chaparral Exhibits D048), Jun. 18, 1905.

Header File with Structure Definitions (Davies Ex 4 (CNS 180009–018)) (CD–ROM Chaparral Exhibits D049), Aug. 8, 1996.

C++ SourceCode for the SCSI Command Handler (Davies Ex 5 (CNS 179136–168)) (CD–ROM Chaparral Exhibits D050), Aug. 8, 1996.

Header File Data Structure (Davies Ex 6 (CNS 179997–180008)) (CD–ROM Chaparral Exhibits D051), Jan. 2, 1997.

SCSI Command Handler (Davies Ex 7 (CNS 179676–719)) (CD–ROM Chaparral Exhibits D052), Jan. 2, 1997.

Coronado: Fibre Channel to SCSI Intelligent RAID Controller Product Brief (Kalwitz Ex I (CNS 182804–805)) (CD–ROM Chaparral Exhibits D053).

Bill of Material (Kalwitz Ex 2 (CNS 181632–633)) (CD–ROM Chaparral Exhibits D054), Mar. 17, 1997.

Emails Dated Jan. 13–Mar. 31, 1997 from P. Collins to Mo re: Status Reports (Kalwitz Ex 3 (CNS 182501–511)) (CD–ROM Chaparral Exhibits D055).

Hardware Schematics for the Fibre Channel Daughtercard Coronado (Kalwitz Ex 4 (CNS 181639–648)) (CD–ROM Chaparral Exhibits D056).

Adaptec Schematics re AAC–340 (Kalwitz Ex 14 CNS 177215–251)) (CD–ROM Chaparral Exhibits D057).

Bridge Product Line Review (Manzanares Ex 3 (CNS 177307–336)) (CD–ROM Chaparral Exhibits D058).

AEC Bridge Series Products–Adaptec External Controller RAID Products Pre–Release Draft, v.6 (Manzanares Ex 4 (CNS 174632–653)). (CD–ROM Chaparral Exhibits D059), Oct. 28, 1997.

Hewlett–Packard Roseville Site Property Pass for Brian Smith (Dunning Ex 14 (HP 489) (CD–ROM Chaparral Exhibits D078), Nov. 7, 1996.

Distribution Agreement Between Hewlett–Packard and Crossroads (Dunning Ex 15 (HP 326–33) (CD–ROM Chaparral Exhibits D079).

HPFC–5000 Tachyon User's Manuel, First Edition (PTI 172419–839) (CD–ROM Chaparral Exhibits D084), May 1, 1996.

X3T10 994D—(Draft) Information Technology: SCSI–3 Architecture Model, Rev. 1.8 (PTI 165977) (CD–ROM Chaparral Exhibits D087).

X3T10 Project 1047D: Information Technology—SCSI–3 Controller Commands (SSC), Rev, 6c (PTI 166400–546) (CD–ROM Chaparral Exhibits D088), Sep. 3, 1996.

X3T10 995D—(Draft) SCSI–3 Primary Commands, Rev. 11 (Wanamaker Ex 5 (PTI 166050–229)) (CD–ROM Chaparral Exhibits D089), Nov. 13, 1996.

VBAR Volume Backup and Restore (CRDS 12200–202) (CD–ROM Chaparral Exhibits D099).

Preliminary Product Literature for Infinity Commstor's Fibre Channel to SCSI Protocol Bridge (Smith Ex 11; Quinsenberry Ex 31 (SPLO 428–30) (CD–ROM Chaparral Exhibits D143), Aug. 19, 1996.

Letter dated Jul. 12, 1996 from J. Boykin to B. Smith re: Purchase Order for Evaluation Units from Crossroads (Smith Ex 24) CRDS 8556–57) (CD–ROM Chaparral Exhibits D144).

CrossPoint 4100 Fibre Channel to SCSI Router Preliminary Datasheet (Hulsey Ex 9 (CRDS 16129–130)) (CD–ROM Chaparral Exhibits D145), Nov. 1, 1996.

CrossPoint 4400 Fibre Channel to SCSI Router Preliminary Datasheet (Bardach Ex. 9, Quisenberry Ex 33 (CRDS 25606–607)) (CD–ROM Chaparral Exhibits D153), Nov. 1, 1996.

Fax Dated Jul. 22, 1996 from L. Petti to B. Smith re: Purchase Order from Data General for FC2S Fibre to Channel SCSI Protocol Bridge Model 11 (Smith Ex 25; Quisenberry Ex 23; Bardach Ex 11 (CRDS 8552–55; 8558) (CD–ROM Chaparral Exhibits D155).

Email Dated Dec. 20, 1996 from J. Boykin to B. Smith re: Purchase Order for Betas in Feb. and Mar. (Hoese Ex 16, Quisenberry Ex 25; Bardach Ex 12 (CRDS 13644–650) (CD–ROM Chaparral Exhibits D156).

Infinity Commstor Fibre Channel Demo for Fall Comdex, 1996 (Hoese Ex 15, Bardach Ex 13 (CRDS 27415) (CD–ROM Chaparral Exhibits D157).

Fax Dated Dec. 19, 1996 from B. Bardach to T. Rarich re: Purchase Order Information (Bardach Ex 14; Smith Ex 16 (CRDS 4460)) (CD–ROM Chaparral Exhibits D158).

Miscellaneous Documents Regarding Comdex (Quisenberry Ex 2 (CRDS 27415–465)) (CD–ROM Chaparral Exhibits D165).

CrossPoint 4100 Fibre Channel to SCSI Router Preliminary Datasheet (Quisenberry) Ex 3 (CRDS 4933–34) (CD–ROM Chaparral Exhibits D166) (CD–ROM Chaparral Exhibits D166).

CrossPoint 4400 Fibre to Channel to SCSI Router Preliminary Datasheet; Crossroads Company and Product Overview (Quisenberry Ex 4 (CRDS 25606; 16136)) (CD–ROM Chaparral Exhibits D167).

Crossroads Purchase Order Log (Quisenberry Ex 9 (CRDS 14061–062)) (CD–ROM Chaparral Exhibits D172).

RAID Manager 5 with RDAC 5 for UNIX V.4 User's Guide (LSI–01854) (CD–ROM Chaparral Exhibits P062), Sep. 1, 1996.

Letter dated May 12, 1997 from Alan G. Leal to Barbara Bardach enclosing the original OEM License and Purchase Agreement between Hewlett–Package Company and Crossroads Systems, Inc. (CRDS 02057) (CD–ROM Chaparral Exhibits P130).

CR4x00 Product Specification (CRDS 43929) (CD–ROM Chaparral Exhibits P267), Jun. 1, 1998.

Symbios Logic—Hardware Functional Specification for the Symbios Logic Series 3 Fibre Channel Disk Array Controller Model 3701 (Engelbrecht Ex 3 (LSI–1659–1733) (CD–ROM Pathlight Exhibits D074).

Report of the Working Group on Storage I/O for Large Scale Computing; Department of Computer Science Duke University: CS–1996–21 (PTI 173330–347). (CD–ROM Pathlight Exhibits D098).

Brian Allison's 1999 Third Quarter Sales Plan (PDX 38) CNS 022120–132)) (CD–ROM Pathlight Exhibits D201), Jun. 5, 2001.

Brooklyn SCSI–SCSI Intelligent External RAID Bridge Definition Phase External Documentation (CD–ROM Pathlight Exhibits D129).

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *